United States Patent Office 3,167,198
Patented Jan. 26, 1965

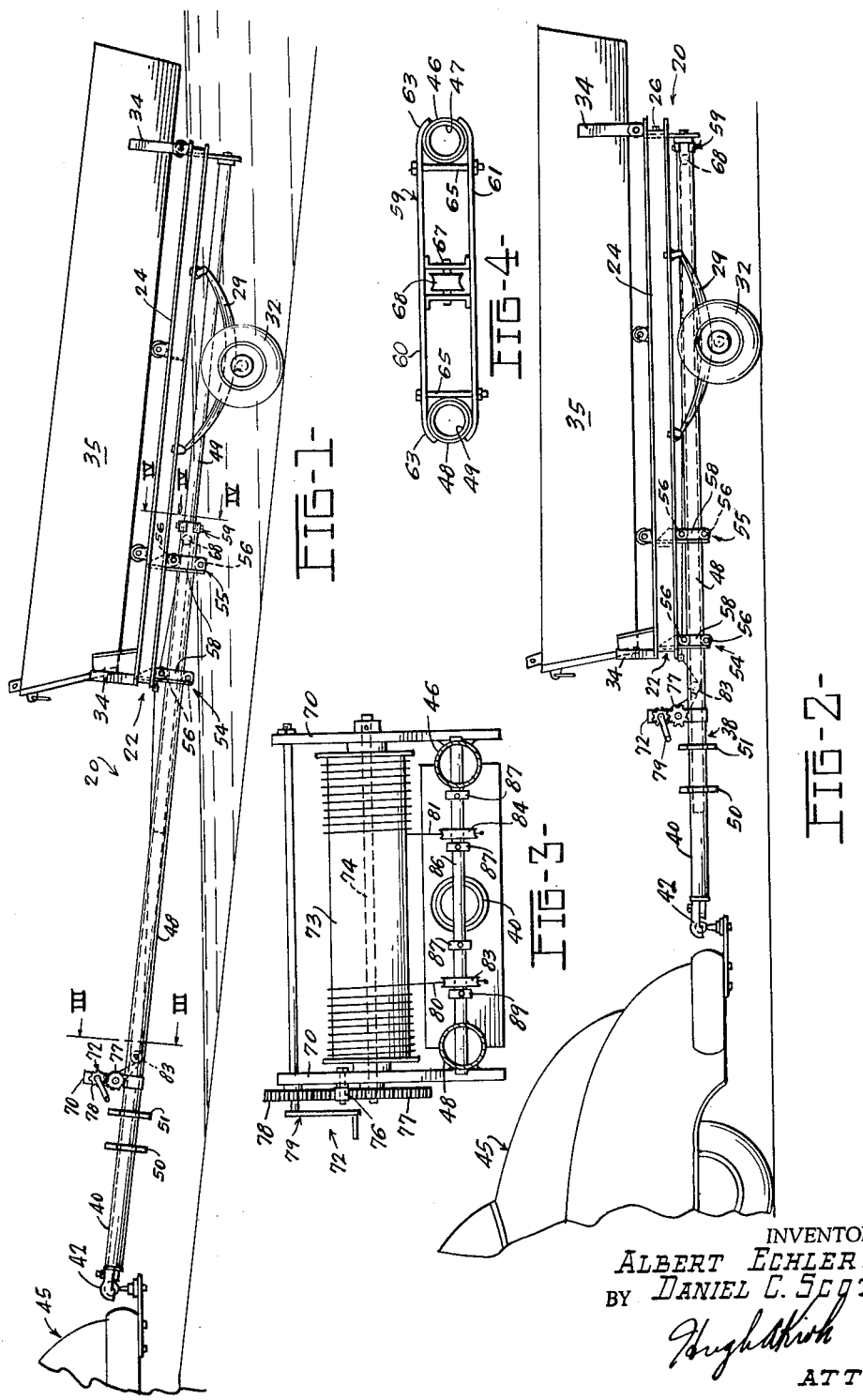

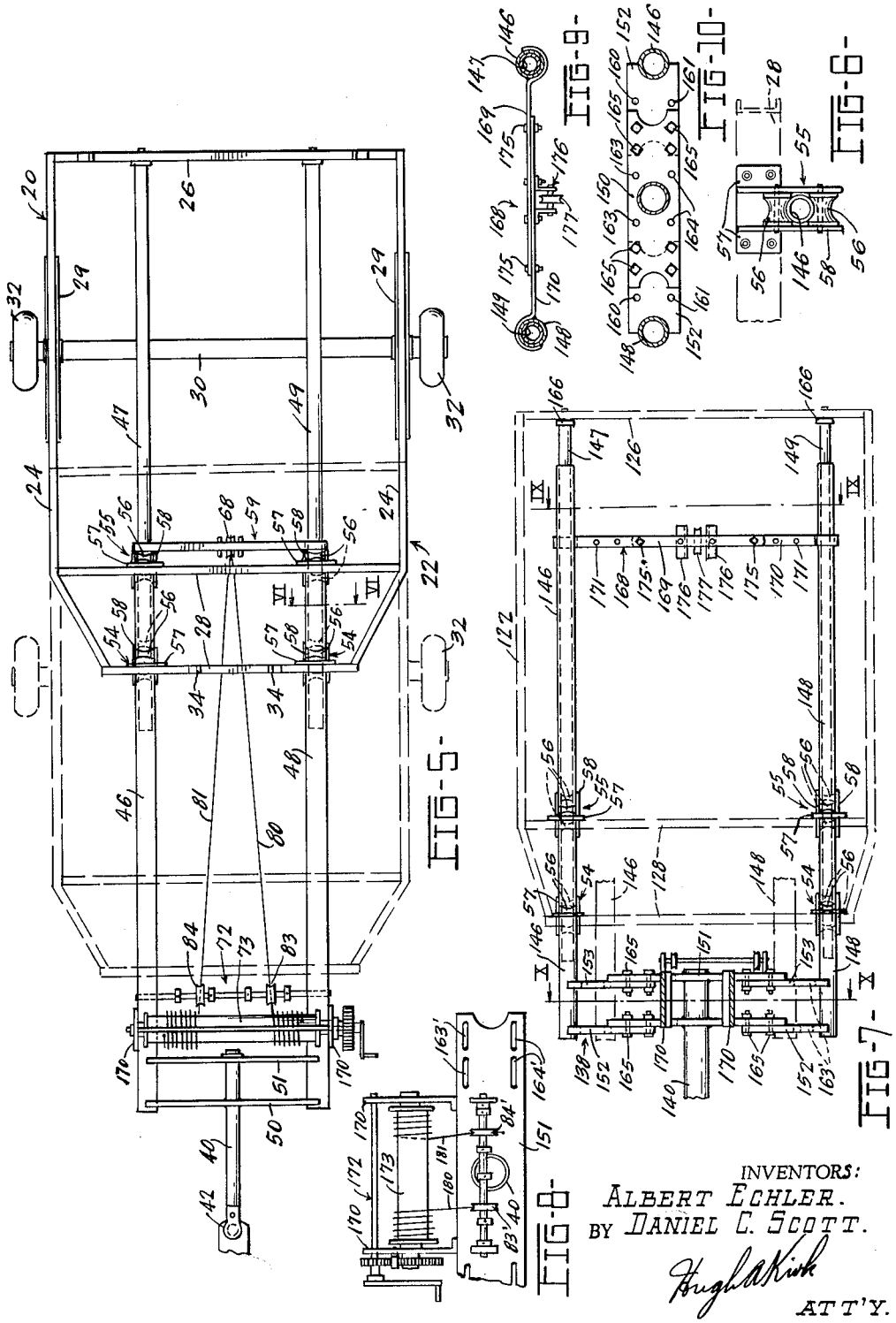

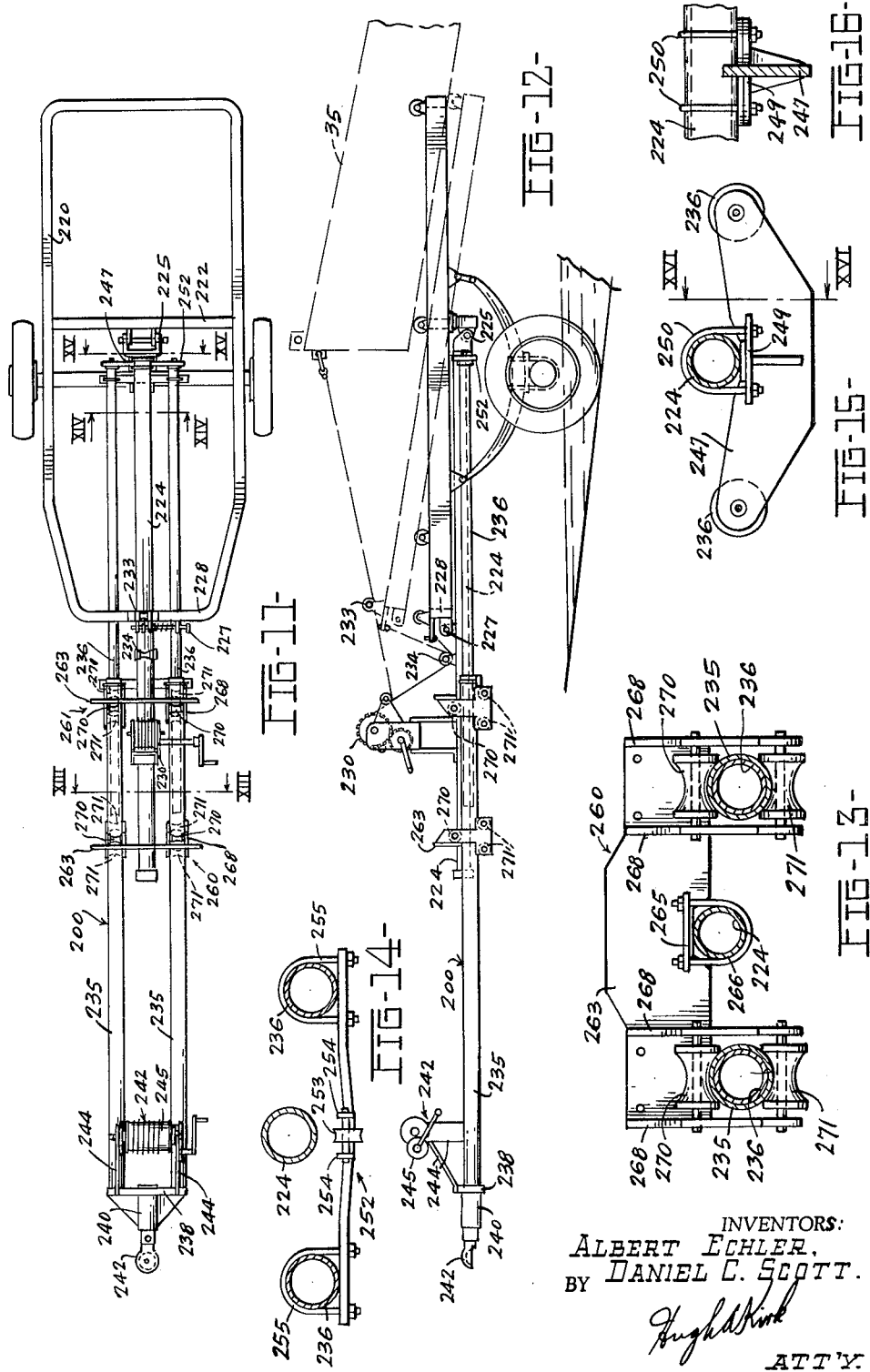

3,167,198
EXTENSIBLE TRAILER
Albert Echler, 703 S. Indian River Road, and Daniel C. Scott, 505 Beach Court, both of Fort Pierce, Fla.
Filed Aug. 20, 1962, Ser. No. 217,995
11 Claims. (Cl. 214—505)

This invention relates to new and useful improvements in trailers and has particular utility in connection with boat trailers.

An object of the present invention is to provide a trailer with extensible means by which a main frame structure may be moved from a position close to a towing vehicle to a position well extended therefrom.

Another object of the present invention resides in the provision of a telescoping intermediate or sub-frame structure interposed between the trailer tow pole and the main frame to permit the latter to be extended substantially its full length outwardly of its retracted position.

Another object of the present invention is to provide a trailer with pairs of longitudinal telescoping intermediate frame members for connecting the tow pole to the main frame and having winch means associated therewith by which the main frame may be extended and retracted with respect to the intermediate frame.

Another object of the present invention resides in the provision of attachment means for converting a fixed frame type of trailer into an extensible frame type of trailer.

Another object of the invention is to provide laterally and longitudinally adjustable conversion frame structure to fit conventional trailers of various sizes and types including tilt bed trailers.

Generally speaking, the present invention comprises intermediate frame structure in the form of tubular telescopic members extending longitudinally of the main frame or bed of a trailer, there being fixed or adjustable cross members for spacing the front ends of the outer of said telescopic members laterally and from which a tow pole extends. The main frame is movably mounted on the outer telescopic members by means such as rollers attached to the main frame. Mounted transversely of the outer tubular members adjacent the leading ends thereof is a winch on the drum of which are oppositely wound a pair of cables. One of the cables is attached directly to a front cross member of the main frame for moving the frame in one direction, while the other cable is passed around a pulley, mounted on a fixed spacer at the rear of the outer tubular members, and then attached to the front cross member for moving the frame in the other direction.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a side elevation of a boat trailer incorporating the present invention and showing the main frame in the water or in its extended position with respect to the tow pole and the near end of a towing vehicle;

FIG. 2 is a view similar to FIG. 1 but showing the main frame in its retracted position for towing;

FIG. 3 is an enlarged view in the direction of arrows III—III of FIG. 1, showing a winch structure for controlling the position of the trailer main frame;

FIG. 4 is an enlarged sectional detail view taken in the direction of arrows IV—IV of FIG. 1 illustrating a combined pulley bracket and stop for limiting relative movement of the structure in one direction;

FIG. 5 is a top plan view of the trailer shown in FIG. 1 with the retracted position of the main frame being shown in dotted lines;

FIG. 6 is a detail view on a line VI—VI of FIG. 5 illustrating a form of roller bracket forming a part of the invention;

FIG. 7 is a top plan view of another embodiment of this invention showing a laterally adjustable sub-frame for installation with various trailer frames with the winch being broken away along its supporting brackets;

FIG. 8 is an enlarged elevational view illustrating a modified installation for the winch shown in FIG. 3 which is particularly adapted for the embodiment shown in FIG. 7;

FIG. 9 is a sectional detail view taken in the direction of the arrows IX—IX of FIG. 7 showing the adjustable width pulley bracket and stop;

FIG. 10 is a sectional view taken in the direction of arrows X—X of FIG. 7 showing the adjustable width cross members;

FIG. 11 is a top plan view of another form of the invention for use with a tilt bed trailer;

FIG. 12 is a side elevation of the trailer shown in FIG. 11;

FIG. 13 is an enlarged detail view taken in the direction of arrows XIII—XIII of FIG. 11, showing a roller bracket assembly;

FIG. 14 is an enlarged detail view taken in the direction of arrows XIV—XIV of FIG. 11 showing a combined brace and pulley bracket;

FIG. 15 is an enlarged detail view taken in the direction of arrows XV—XV of FIG. 11 showing a mounting bracket for the inner telescopic members; and FIG. 16 is a sectional detail view taken on a line XVI—XVI of FIG. 15.

Referring to the drawings, the invention has been illustrated as incorporated in a boat trailer and also as a sub-assembly for converting a conventional fixed bed trailer into an extendable bed trailer. With particular reference to FIGS. 1 through 5, a trailer, which may be a boat trailer, has been illustrated generally at 20. Trailer 20 includes a load carrying frame 22 having longitudinally extending frame members or side rails 24 connected by a rear transverse cross member 26 and a pair of spaced front transverse cross members 28. The frame members 24, 26 and 28 may be of any desired cross-section such as tubular, I-beam or wide U-channel as shown. To frame 22 may be connected by springs 29, a transverse axle 30, on the ends of which are mounted wheels 32. When trailer 20 is used for boats or the like, suitable cradle means shown somewhat diagramatically at 34, may be provided for supporting a boat 35.

Associated with the main frame 22, is a sub-frame indicated generally at 38 to the forward end of which is secured a draw bar or tow pole 40 provided with hitch means 42 for attachment to a towing vehicle 45. As particularly shown in FIG. 5, the sub-frame 38 is inclusive of spaced pairs of telescopic members 46, 47 and 48, 49. The outer members 46 and 48 are shown as being tubular, although they may be of other section, and spaced at their forward ends by transverse cross-bars 50 and 51 secured as by welding at spaced points longitudinally of members 46 and 48. Tow pole 40 is also secured to bars 50 and 51 as by welding thereto intermediate their ends to project forwardly therefrom centrally of frame 38.

The front cross members 28 of the trailer main frame 22 are provided with spaced roller assemblies 54 and 55 (see FIG. 6), the opposed rollers 56 of which engage the outer tube members 46 and 48. Each assembly 54 and 55 includes a bracket member 57 the opposed flanges 58 of which journally support the rollers 56. When secured to members 28 assemblies 54 and 55 support frame 22 for sliding movement on members 46 and 48.

Adjacent the rear ends of the members 46 and 48 is a clamp member 59 (see FIG. 4) which may include upper and lower strap-like members 60, 61 having arcuate ends 63 embracing the tube members 46 and 48 and so held by bolt and nut assemblies 65. Mounted between and centrally of members 60 and 61 is a pulley bracket 67 between the sides of which is journalled a pulley 68.

To the rear cross member 26 may be welded or otherwise secured the rear ends of inner members 47 and 49 in suitably spaced relation to be telescopically received within outer tube members 46 and 48. Inner member 47 and 49 may also be tubular, and serve to guide and support main frame 22 during travel to and from extended position as later described.

Projecting upwardly from each outer tube member 46 and 48 adjacent the rearmost of its forward pair of cross bars 51 is a bracket 70 on which a winch 72 is mounted. Winch 72 (see FIG. 3) is inclusive of a drum 73 mounted on a shaft 74 carried by bracket 70. One end of shaft 74 carries a gear 77 in mesh with a second gear 78. When manually operated, gear 78 may be rotated by a crank 79 on which the gear 78 is mounted. A dog or pawl 76 pivoted to bracket 70 may engage one of the gears to lock rotation of the drum 73 and correspondingly the position of the main frame 22 relative to the tongue 40. A power winch may be substituted for a hand winch as will be understood. Oppositely wound on drum 73 are a pair of cables or ropes 80 and 81 which pass around pulleys 83 and 84. The pulleys 83 and 84 are rotatably mounted and axially movable on a shaft 86 fixed to outer tube members 46 and 48 and to one side of brackets 70. Pulleys 83 and 84 may be adjustably spaced on shaft 86 by means such as spaced collars 87, which spacing may be varied in accordance with the length of travel of cables 80 and 81. Cable 80 passes from pulley 83 directly to the front frame member 28 while cable 81 passes from its guide pulley 84 to pulley 68 on clamp member 59 on the movable intermediate frame 38 and then to frame member 28. By such arrangement, rotation of drum 73 in one direction, as clockwise when viewed from the gear 77 end thereof, winds cable 80 onto drum 73 to move frame 22 rearwardly or to extended position on subframe 38, while rotation of drum 73 in the opposite direction winds cable 81 on drum 73 to move frame 22 forwardly on sub-frame 38 or to retracted position. When one cable 80 or 81 is being wound on drum 73 the other cable is unwound to thus keep the cables taut and to positively and immediately initiate the movement of the frame 22 in either direction.

As previously indicated, the above structure can be incorporated as a complete trailer, or the sub-frame 38 may be substituted for the tongue or tow pole of a conventional trailer by modifying the main frame to accommodate the sub-frame structure. In order to provide a structure still more readily adaptable to various makes and sizes of trailers, the modified arrangement shown in FIGS. 7 through 10 may be utilized.

With particular reference to the modification shown in FIG. 7, details of which are illustrated in FIGS. 8, 9 and 10, the sub-frame 138 is adjustable so that it may be installed in trailers having main frames of various sizes or those having structure that would interfere with the previously described arrangement. As shown in broken lines, a main frame 122 of conventional type having suitable cross members 126 and 128 may have roller assemblies 54 and 55, similar to those shown in FIG. 6, secured adjacent the outer ends of front cross members 128. The roller assemblies 54 and 55 each have opposed side plates 58 between which rollers 56 are journalled and may be spaced at other convenient points on members 128 to receive longitudinally extending outer tubular members 146 and 148 on which the frame 122 is slidably supported.

Fixed adjacent the forward ends of tubular members 146 and 148 are longitudinally spaced cross bar extensions 152 and 153 which extend transversely inwardly for connection to cross bars 150 and 151 secured to the inner end 141 of tow pole 140. Parallel series of spaced holes 160 and 161 are provided adjacent the inner ends of extensions 152 and 153 as shown in FIG. 10, and similarly arranged holes 163 and 164 (or slots 163' and 164' as shown in bar 150 in FIG. 8) may be provided adjacent each end of cross bars 150 and 151 for registry with holes 160 and 161. Bolt and nut assemblies or other fasteners 165 are received in the holes to retain the bars 150, 151 and 152, 153 in adjusted position and the tubular members 146 and 148 in parallelism. Telescopically received within the rearmost ends of tubular members 146 and 148 are members 147 and 149 the outer ends of which may be welded or otherwise secured at 166 to the rear cross member 126 of the main frame 122. The location of the welds is dependent upon the spacing of roller assemblies 54 and 55 on cross members 128. A laterally adjustable cross member 168 (see FIG. 9) is secured at its opposite ends to outer tubular members 146 and 148 as by welding, the member 168 comprising a pair of overlapping sections 169 and 170 each provided with spaced apertures 171 selectively alignable to receive fasteners such as bolt and nut assemblies 175. Pulley bracket 176 journally supports a pulley 177 and is bolted or otherwise secured to member 168.

A winch 172 may be mounted adjacent the forward end of sub-frame 138 either on a separate cross-member or may have its brackets 170 fixed to the members 150 and/or 151 as shown in FIGS. 6 and 7. Drum 173 has cables 180 and 181 wound thereon and operable to extend and retract the main frame in the same manner as described in connection with FIGS. 1 through 5 above.

Referring now to the form of the invention shown in FIGS. 11 through 16, sub-frame structure 200 is provided for trailers of the tiltable bed or main frame type. The trailer bed or frame 220 may be inclusive of an intermediate cross member 222 to which a tongue 224 is pivotally connected as at 225, so that the rear of bed 220 may tilt downwardly with respect to tongue 224, the front end of which tongue 224 is ordinarily provided with a hitch (not shown) for attachment to a towing vehicle. Such arrangement facilitates the loading and unloading of a boat, for example, from or into the water by providing a ramp-like structure, as shown in dotted lines in FIG. 12. The bed 220 may be secured in its horizontal or transport position by a lock or latch means 227 between the front frame member 228 and the tongue 224. A winch 230, also mounted on the tongue 224, and having a cable 232 associated therewith may be used either for pulling a boat 35 onto the tilted frame bed 220 of the trailer by extending over the roller 233 as shown in dotted lines in FIG. 12 or under the roller 234 as shown in full lines and attached to the frame member 228 for retracting bed 220 from its tilted position.

To further enhance the utility of this type of trailer, sub-frame 200 is incorporated therewith to permit extension and retraction of the bed 220 with respect to a towing vehicle. The sub-frame 200 is inclusive of laterally spaced pairs of telescoping outer and inner members 235 and 236, the forward ends of the outer members 235 being connected by a transverse member or bar 238 from which a short tow pole 240 extends for mounting trailer vehicle hitch member 242. Adjacent cross bar 238 is mounted a winch 243 supported by frame structure 244 between the side members of which is journalled a drum 245, on which cables may be wound as previously described for the winches shown in FIG. 3 or 8.

The rearward ends of inner members 236 are connected by a transverse plate 247 (see FIG. 15), the plate 247 in turn being connected to the tongue 224 adjacent bed tilting pivot 225. Centrally of plate 247 is a bracket 249 apertured to receive a pair of U-bolts 250 for rigidly attaching plate 247 to tongue 224 as in FIGS. 15 and 16. Spaced from plate 247 is a pulley bracket 252 centrally of which is mounted a pulley 253 (similar to pulleys 68 and 177 in FIGS. 5 and 6, respectively) journalled in spaced arms 254 (see FIG. 14). Bracket 252 is secured to members 236 by means such as U-bolts 255 which clamps the ends of bracket 252 to members 236 and cooperates with plate 247 to maintain the members 236 in parallelism.

Adjacent the outer end of tongue member 224 are a pair of longitudinally spaced roller bracket assemblies 260 and 261, one at each side of the boat or tilt winch 230. One of these bracket assemblies is shown in FIG. 13 and comprises a transverse plate 263, centrally of which is an attaching plate 265 apertured to receive a pair of U-bolts 266 for clamping plate 263 to the tongue 224. Depending from the extremities of plate 263 are a pair of spaced arms 268 in which are journalled upper and lower rollers 270 and 271, respectively, between which are disposed the outer sub-frame members 235. Roller brackets 260 and 261 are rigid with tongue 224 and thus longitudinally fixed relative to bed 220, the rollers 270 and 271 serving to permit the bed to be freely extended and retracted with respect to the tow pole 240 and thus the towing vehicle in response to operation of winch 243. It will be noted that lower rollers 271 (see FIG. 12) may be a pair of such rolls to further support the trailer bed 220 during its movement along the outer members 235. Such a roller-pair arrangement may also be incorporated in the previously described forms of the invention.

In all forms of the invention, a sub-frame attachable to a towing vehicle, is provided and on which the main frame of the trailer may be moved relative to the sub-frame to extend or retract the main frame with respect to such towing vehicle to facilitate loading and/or unloading and transporting the trailer, such movement of the main frame in both directions being controlled by a single actuator, namely, a winch.

While there is described above the principles of this invention in connection with specific apparatus, it is to be clearly understood that this description is made only by way of example and not as a limitation to the scope of this invention.

What is claimed is:

1. A longitudinally extensible trailer comprising:
 (a) a main frame,
 (b) wheels connected to said main frame,
 (c) a tow pole,
 (d) a sub-frame underlying said main frame including,
  (1) a pair of longitudinally extending members,
  (2) means for connecting said members to said tow pole,
  (3) roller means depending from said main frame and engaging said longitudinal members on which said main frame is movably supported with respect to said longitudinal members, and
 (e) winch means between said tow pole and the front end of said main frame for moving said main frame along said longitudinal members in both directions to extend or retract said trailer.

2. A trailer for boats and the like comprising:
 (a) a load carrying frame,
 (b) supporting wheels attached to said frame,
 (c) a tow pole,
 (d) means for attaching said tow pole to a towing vehicle,
 (e) a first pair of tubular members secured to said tow pole and extending longitudinally below said frame,
 (f) means to space said first tubular members laterally of said frame,
 (g) roller means depending from said frame for movably mounting said frame on said first pair of tubular members,
 (h) a second pair of tubular members telescoped within said first tubular pair of members and secured to said frame for guiding its movement, and
 (i) winch means between said tow pole and said frame for extending and retracting said frame with respect to said first tubular members.

3. A trailer according to claim 2 wherein the means for movably mounting the frame includes spaced sets of rollers movable along said first tubular members.

4. An extensible trailer comprising,
 (a) a main frame,
 (b) a draw bar, and
 (c) an intermediate frame, comprising:
  (1) two pair of parallel telescoping rail members, one pair being attached at their rearward ends to said main frame, and the other pair being attached at their forward ends to said draw bar,
  (2) pairs of spaced rollers connected to said main frame near the forward ends of said one pair of rail members for guiding said other pair of rail members in their telescoping movement over said one pair of rail members,
  (3) winch means attached near the forward ends of said other pair of rail members, and
  (4) cable means wound on said winch means for moving said draw bar and said other pair of rail members longitudinally with respect to said main frame and said one pair of rail members, said cable means comprising:
   one reach of cable attached directly between said winch means and said main frame near the forward ends of said one pair of rail members,
   a pulley attached near the rear ends of said other pair of rail members, and
   another reach of cable attached to said winch means and extending around said pulley and back to said main frame near the attachment of said one reach of cable,
 whereby operation of said winch means positively moves said main frame relative to said draw bar in both directions.

5. A trailer according to claim 4 wherein said frame includes supporting wheels and a tiltable deck.

6. A trailer according to claim 5 wherein said main frame also includes a winch means for operating said tiltable deck.

7. A trailer according to claim 4 wherein said intermediate frame is mounted below said main frame.

8. A trailer according to claim 4 wherein said pairs of parallel telescoping rail members comprise pairs of telescoping tubular members.

9. A trailer according to claim 4 wherein said pairs of telescoping rail members include cross bars for maintaining the space between said members.

10. A trailer according to claim 9 wherein said cross bars include means for adjusting the spacing between said parallel rail members.

11. A trailer according to claim 4 wherein said pairs of spaced rollers are attached directly to said main frame.

References Cited by the Examiner
UNITED STATES PATENTS

| | | | |
|---|---|---|---|
| 2,021,952 | 11/35 | Wren | 214—517 |
| 2,512,798 | 6/50 | Hodges | 214—517 |
| 2,790,673 | 4/57 | Zur Nieden | 280—34 X |
| 2,797,008 | 6/57 | Banker | 214—505 |
| 2,856,087 | 10/58 | Steber | 214—505 X |
| 2,938,642 | 5/60 | Felix | 214—505 |
| 2,944,835 | 7/60 | Englehardt et al. | 214—505 |

HUGO O. SCHULZ, *Primary Examiner.*

GERALD M. FORLENZA, *Examiner.*